United States Patent
Chu et al.

(10) Patent No.: US 12,021,253 B2
(45) Date of Patent: Jun. 25, 2024

(54) BATTERY BOX, BATTERY PACK, AND VEHICLE

(71) Applicant: Contemporary Amperex Technology Co., Limited, Ningde (CN)

(72) Inventors: Yannan Chu, Ningde (CN); Mu Qian, Ningde (CN); Jinqing Ji, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/536,101

(22) Filed: Nov. 29, 2021

(65) Prior Publication Data

US 2022/0085450 A1  Mar. 17, 2022

Related U.S. Application Data

(63) Continuation of application No. PCT/CN2020/084709, filed on Apr. 14, 2020.

(30) Foreign Application Priority Data

May 29, 2019  (CN) .......................... 201920793615.2

(51) Int. Cl.
*H01M 50/249* (2021.01)
*H01M 50/186* (2021.01)
*H01M 50/209* (2021.01)

(52) U.S. Cl.
CPC ....... *H01M 50/249* (2021.01); *H01M 50/186* (2021.01); *H01M 50/209* (2021.01); *H01M 2220/20* (2013.01)

(58) Field of Classification Search
CPC .................................................. H01M 50/249
See application file for complete search history.

(56) References Cited

U.S. PATENT DOCUMENTS

2014/0284125 A1   9/2014 Katayama et al.

FOREIGN PATENT DOCUMENTS

CN  107732061 A   2/2018
CN  207381449 U   5/2018
(Continued)

OTHER PUBLICATIONS

The International search report for PCT Application No. PCT/CN2020/084709, dated May 26, 2020, 14 pages.
(Continued)

*Primary Examiner* — Maria Laios
*Assistant Examiner* — Jordan E Berresford
(74) *Attorney, Agent, or Firm* — East IP P.C.

(57) ABSTRACT

This application discloses a battery box, a battery pack, and a vehicle. The battery box includes: a lower box, including a bottom plate and a side plate connected to and disposed around the bottom plate; an upper box, connected to the side plate, where the upper box contains a cover plate disposed in opposition to the bottom plate, and the upper box and the lower box jointly close in to form an accommodation chamber; and a connector, disposed in the accommodation chamber and connected to the upper box and the lower box. The connector contains a guide channel, and the guide channel runs through the bottom plate and the cover plate along a first direction. The battery box, the battery pack, and the vehicle in this application satisfies requirements on strength of the battery box and connection strength between the battery pack and the vehicle.

10 Claims, 9 Drawing Sheets

(56) References Cited

FOREIGN PATENT DOCUMENTS

| | | | |
|---|---|---|---|
| CN | 207572433 | U | 7/2018 |
| CN | 208111536 | U | 11/2018 |
| CN | 208225961 | U | 12/2018 |
| CN | 209747594 | U | 12/2019 |
| CN | 209843761 | U | 12/2019 |
| DE | 102015204841 | A1 * | 9/2016 |
| DE | 102015204841 | A1 | 9/2016 |
| DE | 102016214289 | A1 | 2/2018 |
| DE | 1020171 00612 | A1 | 7/2018 |
| DE | 102018211471 | B3 | 9/2019 |
| JP | 2016066558 | A | 4/2016 |

OTHER PUBLICATIONS

The First Office Action for India Application No. 202127055234, dated May 4, 2022, 7 pages.
The extended European search report for European Application No. 20813139.1, dated Feb. 23, 2022, 7 pages.
The Communication pursuant to Article 94(3) EPC for European Application No. 20813139.1, dated Jul. 7, 2022, 6 pages.

* cited by examiner

B—B

BATTERY BOX, BATTERY PACK, AND VEHICLE

CROSS-REFERENCE TO RELATED APPLICATIONS

The present application is a continuation of International Application No. PCT/CN2020/084709, filed on Apr. 14, 2020, which claims priority to Chinese Patent Application No. 201920793615.2, filed on May 29, 2019, titled with "BATTERY BOX, BATTERY PACK, AND VEHICLE", both of which are hereby incorporated by reference in their entireties.

TECHNICAL FIELD

This application relates to the technical field of energy storage, and in particular, to a battery box, a battery pack, and a vehicle.

BACKGROUND

A battery pack is typically used for a new energy vehicle, and provides driving power for the new energy vehicle. Examples of the new energy vehicle include a hybrid electric vehicle and a battery electric vehicle. The evolution of new energy technologies has imposed higher requirements on the strength and reliability of the new energy vehicle, and the battery pack is an important part of the new energy vehicle. Therefore, higher requirements are also imposed on the strength of the battery pack and the installation strength between the battery pack and the vehicle.

A conventional battery pack is connected to the hybrid electric vehicle or the battery electric vehicle through a battery box. Generally, a mounting beam readily available to the battery pack is provided around the battery pack on the vehicle. The battery box can be directly connected to the mounting beam. Although this meets connection requirements, such a connection manner makes the battery pack prone to detach from the mounting beam when the vehicle vibrates or collides violently, thereby drastically impairing the driving safety of the vehicle.

Therefore, a new type of battery box, battery pack, and vehicle is urgently needed.

SUMMARY

An embodiment of this application provides a battery box, a battery pack, and a vehicle to increase strength of the battery box and also satisfy requirements on connection strength between the battery pack and the vehicle.

In view of the foregoing problem, according to one aspect of this application, a battery box is provided, including: a lower box, including a bottom plate and a side plate connected to and disposed around the bottom plate; an upper box, connected to the side plate, where the upper box contains a cover plate disposed in opposition to the bottom plate, and the upper box and the lower box jointly close in to form an accommodation chamber; and a connector, disposed in the accommodation chamber and connected to the upper box and the lower box, where the connector contains a guide channel, and the guide channel runs through the bottom plate and the cover plate along a first direction.

In an implementation according to an aspect of this application, surfaces that close in to form the guide channel include a first annular wall face and a second annular wall face that are successively disposed along the first direction, and a transition surface that connects the first annular wall face and the second annular wall face; and, in the first direction, a projection of the second annular wall face surrounds a projection of the first annular wall face.

In any of the foregoing implementations according to an aspect of this application, the connectors are two or more in number, and the two or more connectors are spaced apart from each other.

In any of the foregoing implementations according to an aspect of this application, the connector includes a connecting rod extending along the first direction and a locking piece, one end of the connecting rod is fixedly connected to the bottom plate, the other end of the connecting rod passes through the upper box and is detachably connected to the upper box through the locking piece, and the guide channel is disposed in the connecting rod.

In any of the foregoing implementations according to an aspect of this application, the connecting rod contains a bulge on an outer peripheral surface near the bottom plate, the bottom plate contains a clamping part that fits with the bulge, and the clamping part is at least partially held down onto an end face of the bulge oriented toward the upper box.

In any of the foregoing implementations according to an aspect of this application, the connector further includes a reinforcing rod extending along the first direction and sleeving on the connecting rod, and the reinforcing rod is clamped between the bottom plate and the upper box.

In any of the foregoing implementations according to an aspect of this application, the battery box further includes a first seal that sleeves on the reinforcing rod, and a flange is disposed on an outer peripheral surface of the reinforcing rod; and, in the first direction, a position limiting part that protrudes out of the flange is disposed at one end of the reinforcing rod near the upper box; the flange, the position limiting part, and the upper box close in to form an annular mounting cavity, and the first seal is disposed in the annular mounting cavity.

In any of the foregoing implementations according to an aspect of this application, the battery box further includes a second seal that sleeves on the connecting rod, and the second seal is clamped between the connecting rod and the reinforcing rod.

According to another aspect of this application, a battery pack is provided, including the battery box described above, and a battery module. The battery module is disposed in an accommodation chamber and connected to a lower box.

With the battery box and the battery pack provided in the embodiments of this application, the lower box and the upper box of the battery box are connected to form an accommodation chamber, and the connector is disposed in the accommodation chamber. In addition, the connector is configured to contain a guide channel that runs through the bottom plate and the cover plate along the first direction. Because the connector can connect the bottom plate of the lower box and the cover plate of the upper box, the connector can form an effective support between the lower box and the upper box and reinforce the strength of the battery box. When the battery box withstands a large external force, the connector can support the battery box to prevent deformation. When the battery box is applied to the battery pack, especially when the battery pack withstands an increased external force, the connector can effectively support the battery box and prevent deformation of the battery box, and can effectively prevent damage to the battery module caused by deformation of the battery box, thereby improving reliability and safety performance of the battery pack. In addition, the structure of the connector is so simple that it will not affect the overall weight of the battery pack, thereby further optimizing the performance of the battery pack.

According to still another aspect of this application, a vehicle is provided, including a vehicle body, an energy storage part, and a mounting piece. The energy storage part is disposed in the vehicle body. The energy storage part includes the battery pack described above. The mounting piece is inserted into a guide channel and connected to the vehicle body and the battery pack.

The vehicle provided in the embodiment of this application includes a vehicle body, an energy storage part, and a mounting piece. The energy storage part includes the battery pack. In this way, the mounting piece can plug into the guide channel and connect the vehicle body and the battery pack. Therefore, the connector provides an assembly point for the connection between the battery pack and the vehicle while increasing the strength of the battery pack, thereby effectively improving stability and reliability of the mounting connection between the battery pack and the vehicle.

DESCRIPTION OF DRAWINGS

The following outlines accompanying drawings used in the embodiments of this application. Apparently, a person of ordinary skill in the art may derive other drawings from these accompanying drawings without making any creative efforts.

REFERENCE NUMERALS

Figure 1:
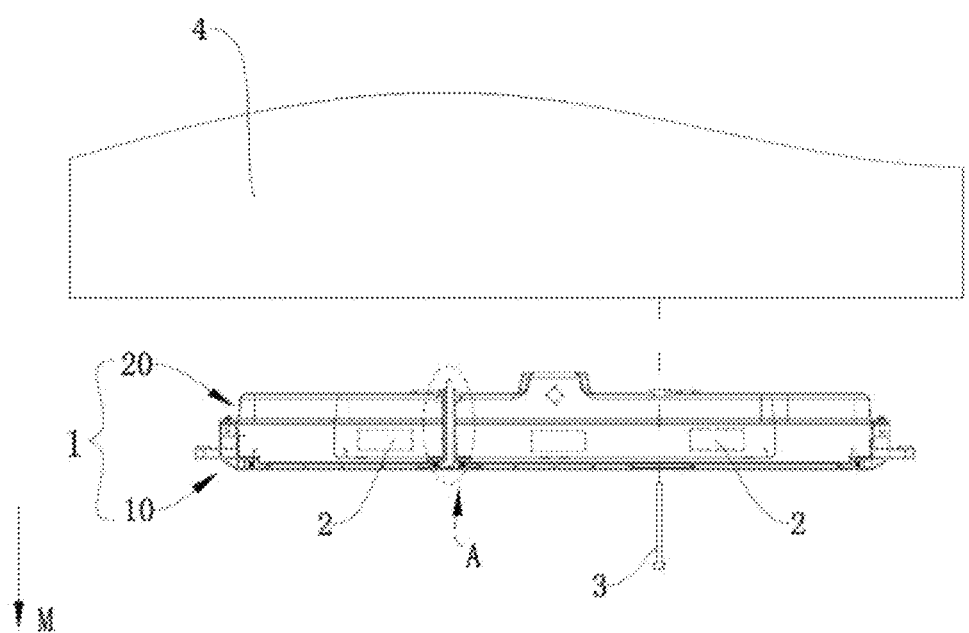
FIG. 1 is an exploded view of a vehicle according to an embodiment of this application.

1: Battery box;
10: Lower box; 101: Bottom plate; 1011: Clamping part; 102: Side plate; 103: Reinforcing rib; 104: Lower connecting plate;
20: Upper box; 201: Cover plate; 202: Lateral end plate; 203: Upper connecting plate;
30: Accommodation chamber;
40: Connector; 401: Guide channel; 4011: First annular wall face; 4012: Second annular wall face; 4013: Transition surface; 402: Connecting rod; 4021: Bulge; 403: Reinforcing rod; 4031: Flange; 4032: Position limiting part; 4033: Mounting part; 404: Locking piece;
50: First seal;
60: Annular mounting cavity;
70: Second seal;
2: Battery module;
3: Mounting piece;
4: Vehicle body;
M: First direction.

DESCRIPTION OF EMBODIMENTS

The following describes features and exemplary embodiments in detail according to each aspect of this application. In the following detailed description, many details are provided to enable a comprehensive understanding of this application. However, it is apparent to a person skilled in the art that this application can be implemented without some of the details. The following description of the embodiments is merely intended to enable a better understanding of this application by illustrating examples of this application. In the accompanying drawings and the following description, at least a part of well-known structures and technologies are omitted to avoid unnecessary ambiguity of this application and, for clarity, the size of some structures may be exaggerated. In addition, the features, structures, or characteristics described below may be combined in one or more embodiments in any appropriate manner.

The directional terms appearing in the following description indicate the directions shown in the drawings, but without limiting specific structures of the battery box, battery pack, and vehicle in this application. In the context of this application, unless otherwise expressly specified, the terms "mount" and "connect" shall be understood in a broad sense. For example, a "connection" may be a fixed connection, a detachable connection, or an integrated connection, and may be a direct connection or an indirect connection. A person of ordinary skill in the art can understand the specific meanings of the terms in this application according to specific situations.

For a better understanding of this application, the following describes a battery box, a battery pack, and a vehicle according to embodiments of this application in detail with reference to FIG. 1 to FIG. 13.

Figure 2:
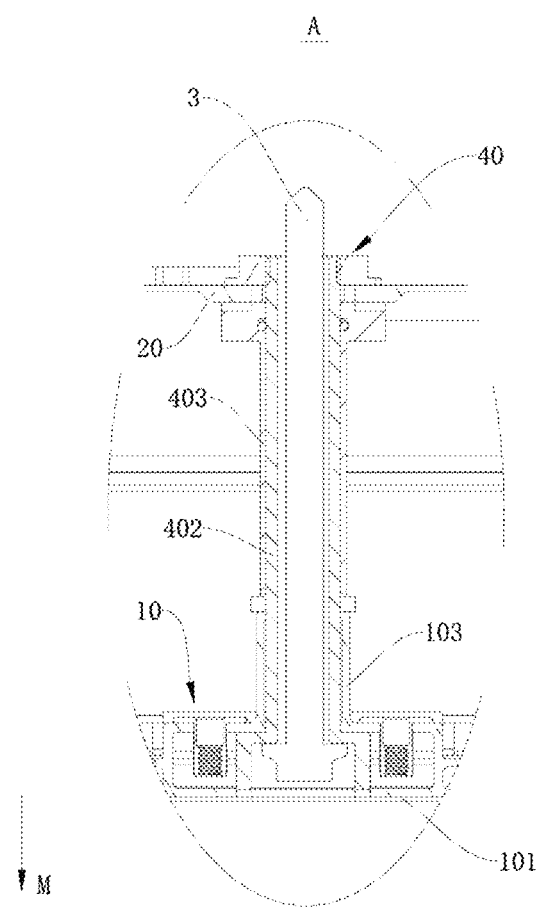
FIG. 2 is a local detailed view of a position A shown in FIG. 1.

FIG. 1 is an exploded view of a vehicle according to an embodiment of this application; and FIG. 2 is a local detailed view of a position A shown in FIG. 1.

Referring to FIG. 1 and FIG. 2, an embodiment of this application provides a vehicle. The vehicle includes a vehicle body 4, an energy storage part, and a mounting piece 3. The energy storage part is disposed in the vehicle body 4, the energy storage part includes a battery pack, and the battery pack can provide power for the vehicle. The mounting piece 3 may be a mounting bolt, and the energy storage part is connected to the vehicle body 4 through the mounting piece 3. When the vehicle is operating, the battery pack in the energy storage part provides power for the operation of the vehicle by discharging, thereby meeting operation requirements of the vehicle.

As can be learned from the above description on the structure of the vehicle, the battery pack provides power for the operation of the entire vehicle. The structural strength of the battery pack and the connection strength between the battery pack and the vehicle body 4 affect the safety performance and reliability of operation of the entire vehicle. When the vehicle has been operating for a long time or a higher reliability requirement is imposed on the vehicle, a higher strength of the battery pack is required.

Figure 3:
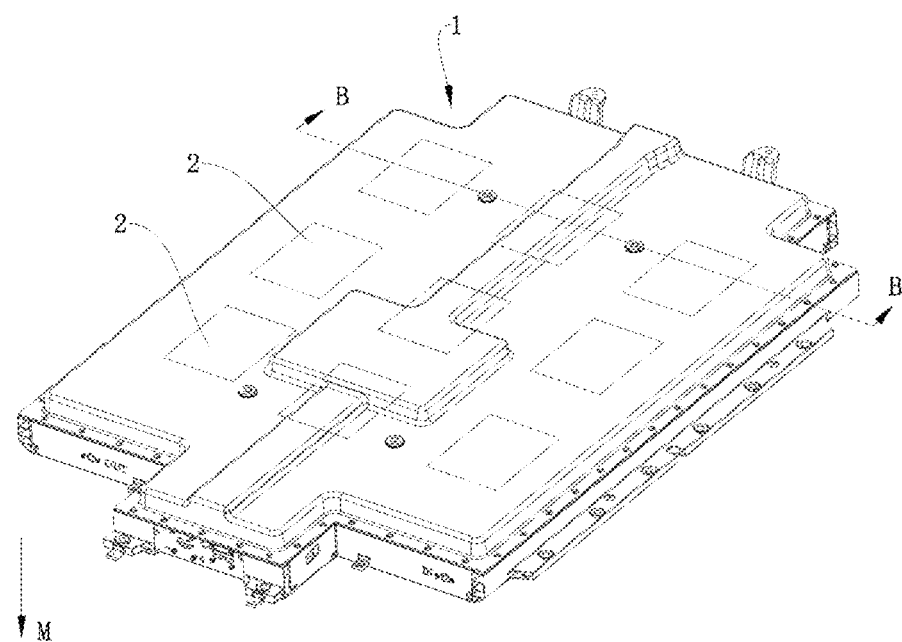
FIG. 3 is a three-dimensional view of a battery pack according to an embodiment of this application.
Figure 4:
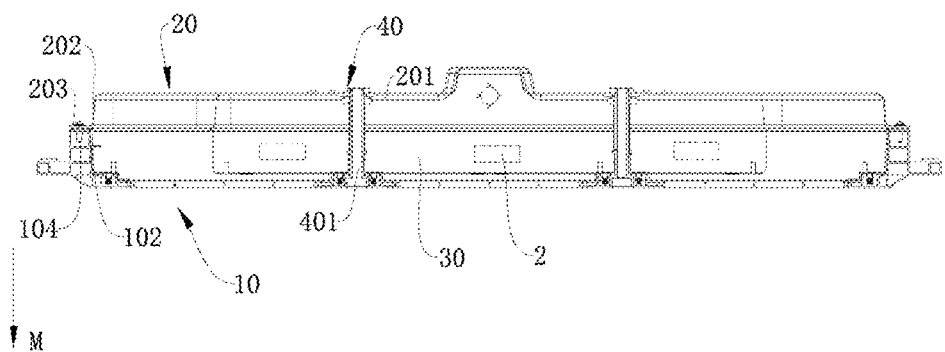
FIG. 4 is a cross-sectional view in a B-B direction of FIG. 3.

Therefore, to better meet the above requirement, an embodiment of this application further provides a new type of battery pack. Referring to FIG. 3 and FIG. 4, FIG. 3 is a three-dimensional view of a battery pack according to an embodiment of this application, and FIG. 4 is a cross-sectional view in a B-B direction of FIG. 3. The battery pack includes a battery box 1 and a battery module 2. The battery box 1 includes an accommodation chamber 30. The battery module 2 is fixedly disposed inside the accommodation chamber 30. The accommodation chamber 30 is an airtight chamber. With the battery module 2 disposed inside the accommodation chamber 30, air and moisture can be kept out of the accommodation chamber 30, thereby effectively preventing the battery module 2 from being affected by external air or moisture and increasing the life of the battery module 2. In an optional embodiment, the battery pack includes a plurality of battery modules 2. The plurality of battery modules 2 are disposed in the battery box 1 in sequence. The quantity of battery modules 2 may be set depending on overall energy storage requirements of the battery pack, and is not limited herein.

Figure 5:
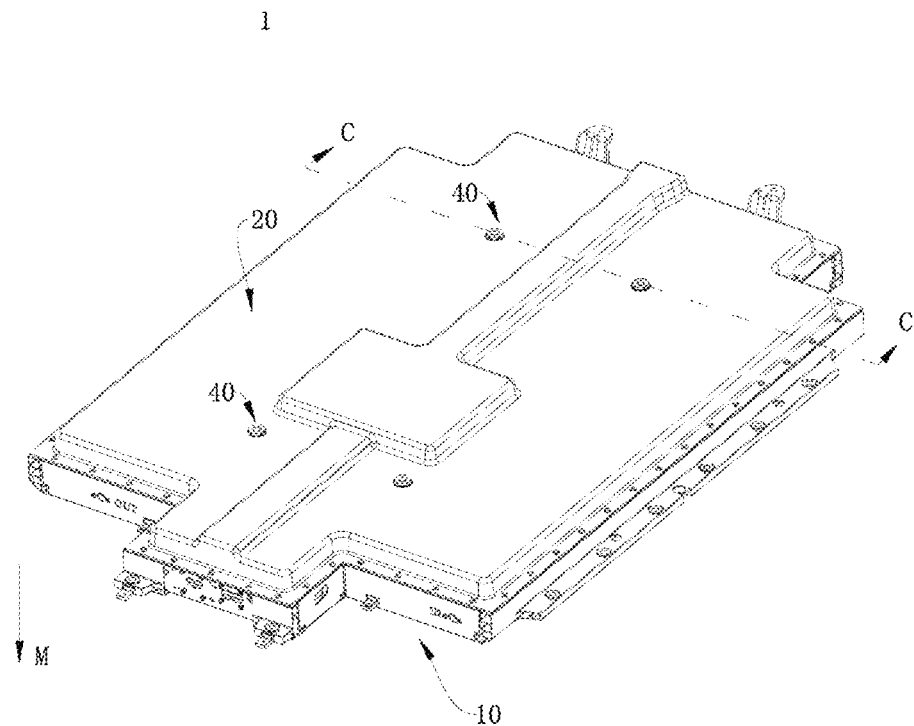
FIG. 5 is a three-dimensional view of a battery box according to an embodiment of this application.
Figure 6:
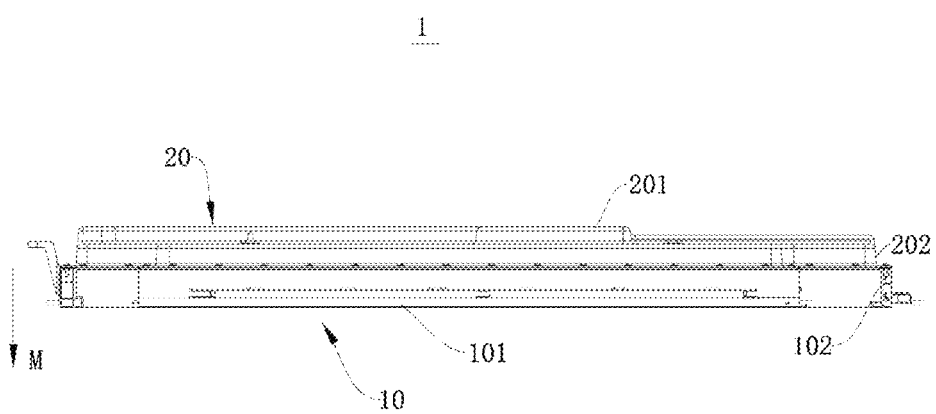
FIG. 6 is a side view of a battery box according to an embodiment of this application.
Figure 7:
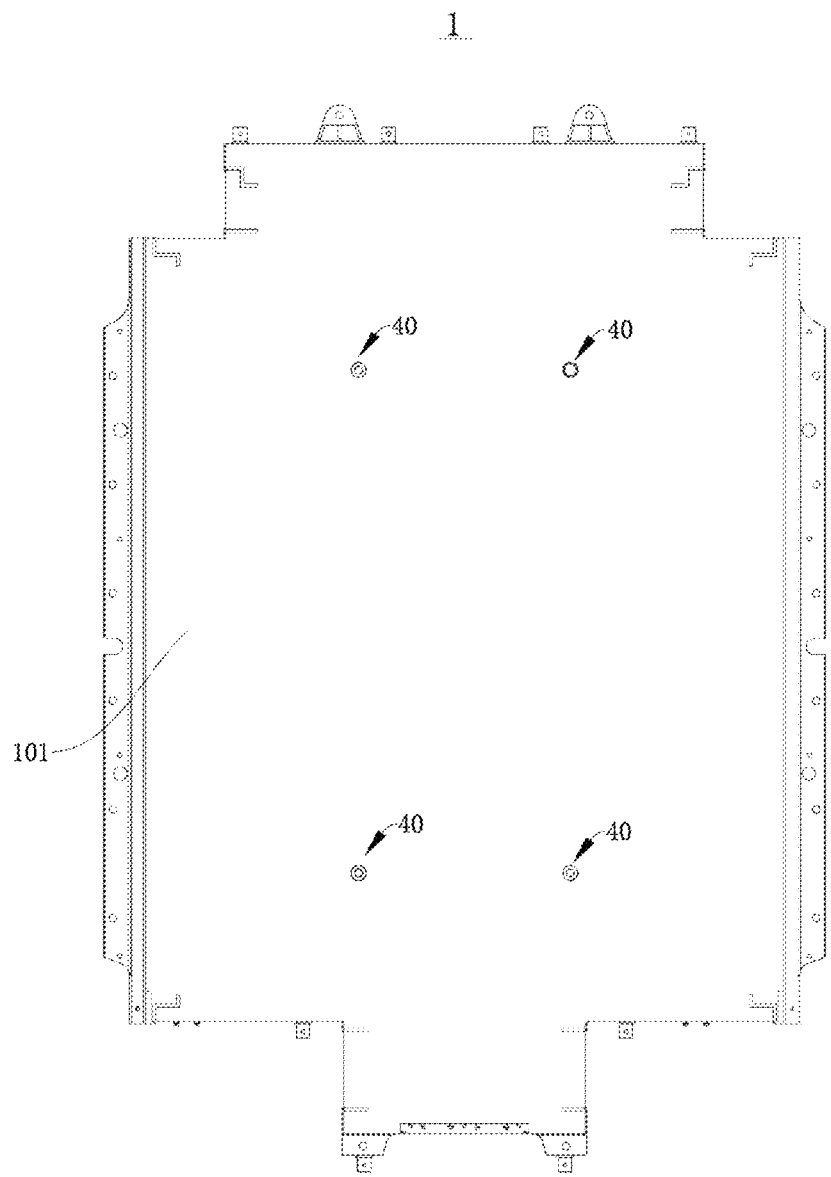
FIG. 7 is a top view of a battery box according to an embodiment of this application.

Referring to FIG. 5 to FIG. 7, FIG. 5 is a three-dimensional view of a battery box according to an embodiment of this application, FIG. 6 is a side view of the battery box according to an embodiment of this application, and FIG. 7 is a top view of the battery box according to an embodiment of this application. In some optional embodiments, the battery box 1 includes a lower box 10, an upper box 20, and a connector 40. The lower box 10 includes a bottom plate 101 and a side plate 102 connected to and disposed around the bottom plate 101. The upper box 20 is connected to the side plate 102. The upper box 20 contains a cover plate 201 disposed in opposition to the bottom plate 101, and the upper box 20 and the lower box 10 jointly close in to form an accommodation chamber 30. The connector 40 is disposed in the accommodation chamber 30 and is connected to the upper box 20 and the lower box 10. The connector 40 contains a guide channel 401, and the guide channel 401 runs through the bottom plate 101 and the cover plate 201 along a first direction M. The first direction M may be an arrangement direction of the cover plate 201 toward the bottom plate 101, or the first direction M may be a thickness direction of the battery box 1. The first direction M may also be a direction in which the cover plate 201 extends along a variety of curves and points to the bottom plate 101. The first direction M may also be a direction in which the cover plate 201 serving as a start point obliquely points to the bottom plate 101. In this embodiment of this application, an example is used for description in which the first direction M is the arrangement direction of the cover plate 201 toward the bottom plate 101.

Still referring to FIG. 1 to FIG. 7, the guide channel 401 is disposed on the connector 40. Therefore, when the battery pack is mounted onto the vehicle body 4, the mounting piece 3 can plug into the guide channel 401 and connect the vehicle body 4 and the battery pack. In this way, the connector 40 can provide an assembly point for the connection between the battery pack and the vehicle, thereby effectively improving stability and reliability of the connection between the battery box 1 and the vehicle.

In a specific implementation, the quantity of the connectors 40 may be set depending on strength requirements of the battery pack or the battery box 1. In some optional embodiments, the connectors 40 are two or more in number, and the two or more connectors 40 are spaced apart from each other. Two or more connectors 40 may be evenly disposed in the middle of the battery box 1 to enhance the strength of the middle of the battery box 1. The middle of the battery box 1 is a middle region in a plane direction of the cover plate 201 or the bottom plate 101. With the two or more connectors 40 disposed, the connection strength of the upper box 20 and the lower box 10 can be further ensured. In addition, the guide channels 401 of the two or more connectors 40 can provide a plurality of mounting spaces for the connection between the battery pack and the vehicle, thereby further improving the stability of the mounting connection between the battery pack and the vehicle and improving the safety performance of the vehicle. Optionally, the quantity of connectors 40 is three, four, five or even more, and is user-definable according to the size and strength requirements of the battery box 1.

Figure 8:
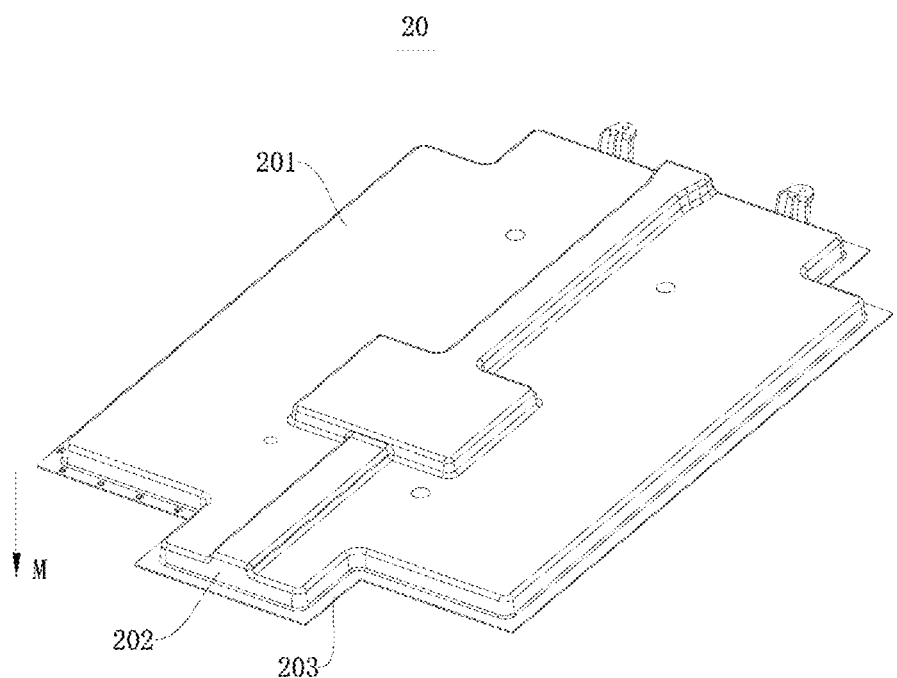
FIG. 8 is a schematic structural diagram of an upper box according to an embodiment of this application.
Figure 9:
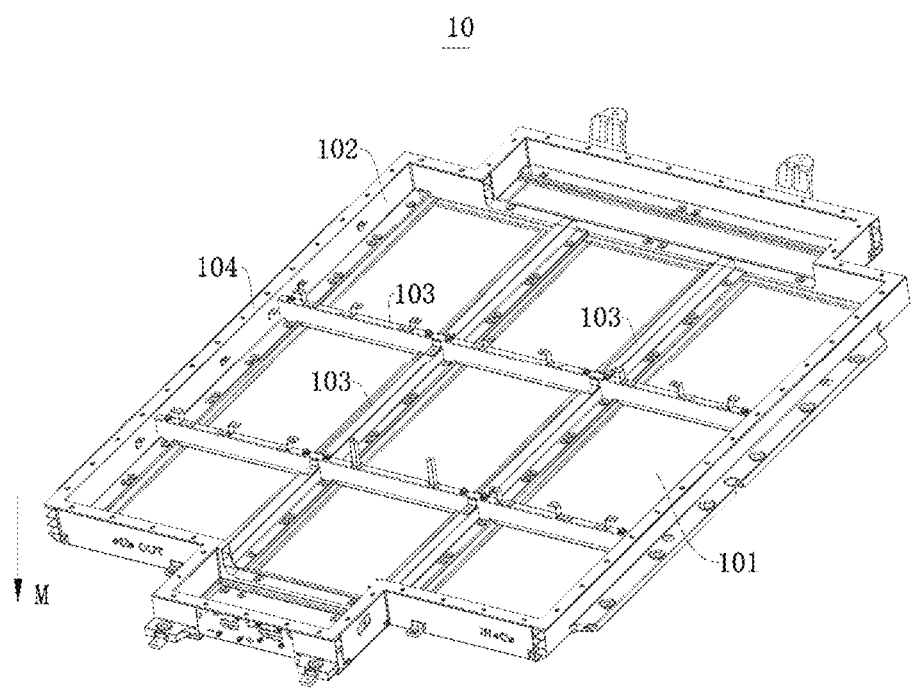
FIG. 9 is a schematic structural diagram of a lower box according to an embodiment of this application.
Figure 10:
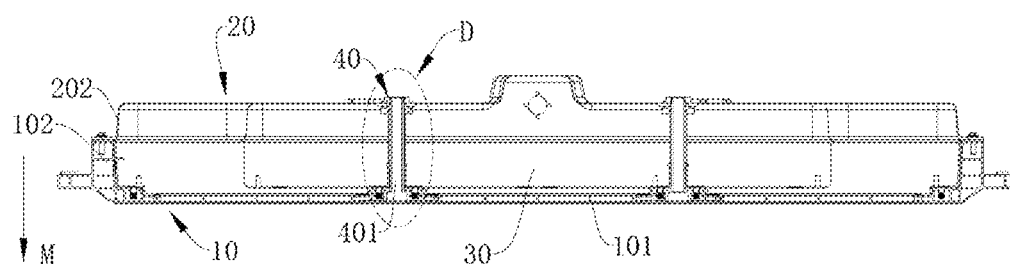
FIG. 10 is a cross-sectional view in a B-B direction of FIG. 5.

Referring to FIG. 8 to FIG. 10, FIG. 8 is a schematic structural diagram of an upper box according to an embodiment of this application, FIG. 9 is a schematic structural diagram of a lower box according to an embodiment of this application, and FIG. 10 is a cross-sectional view in a C-C direction of FIG. 5. In an optional embodiment, the upper box 20 includes a cover plate 201 disposed in opposition to the bottom plate 101, and a lateral end plate 202 connected to and disposed around the cover plate 201. The upper box 20 is connected to the side plate 102 of the lower box 10 through the lateral end plate 202, so that the upper box 20 and the lower box 10 close in to form an accommodation chamber 30.

Specifically, a lower connecting plate 104 is disposed at one end of the side plate 102 of the lower box 10 away from the bottom plate 101. The lower connecting plate 104 is parallel to the bottom plate 101. The lower connecting plate 104 extends from a surface of the side plate 102 near the accommodation chamber 30 to a direction away from the accommodation chamber 30. Correspondingly, an upper connecting plate 203 is disposed at an end of the lateral end plate 202 of the upper box 20 away from the cover plate 201. The upper connecting plate 203 extends from a surface of the lateral end plate 202 near the accommodation chamber 30 to a direction away from the accommodation chamber 30. Connecting holes corresponding to each other are disposed on the lower connecting plate 104 and the upper connecting plate 203. Fasteners are disposed in the connecting holes to connect the upper connecting plate 203 and the lower connecting plate 104, so as to connect the upper box 20 and the lower box 10.

In some optional embodiments, the upper connecting plate 203 is parallel to the lower connecting plate 104, so that the upper connecting plate 203 and the lower connecting plate 104 can better contact each other and also increase a connection area between the upper box 20 and the lower box 10, thereby improving connection stability between the upper box 20 and the lower box 10 and further improving airtightness of the accommodation chamber 30. The upper connecting plate 203 may be integrated with the lateral end plate 202, and the lower connecting plate 104 may be integrated with the side plate 102, to facilitate production and assembly of the battery box 1. In some other examples, the upper box 20 may merely include the cover plate 201, and the cover plate 201 is directly connected to the side plate 102 of the lower box 10. This also meets needs.

In an optional embodiment, the lower box 10 includes a reinforcing rib 103. The reinforcing rib 103 is connected to either or both of the bottom plate 101 and the side plate 102. Specifically, the reinforcing rib 103 is disposed in the accommodation chamber 30. The reinforcing rib 103 may be plural in number. The plurality of reinforcing ribs 103 partitions the lower box 10 into a plurality of accommodation parts. The accommodation parts are configured to fix and accommodate the battery module 2. With the lower box 10 partitioned into a plurality of accommodation parts, a plurality of battery modules 2 can be spaced apart to avoid mutual interference. In addition, the battery modules 2 may be connected to the reinforcing ribs 103 to increase the stability of the connection between the battery module 2 and the battery box 1.

Optionally, the reinforcing rib 103 may be made of a hollow beam, and the plurality of reinforcing ribs 103 may also be connected to each other. The quantity of the reinforcing ribs 103 may be set as required, and the arrangement of the reinforcing ribs 103 may be an array arrangement or an irregular arrangement or the like.

To increase space utilization of the accommodation chamber 30 of the battery box 1, in some optional embodiments, a projection of the connector 40 along the first direction M at least partially overlaps a projection of the reinforcing rib 103 along the first direction M, so that the connector 40 can be disposed on the reinforcing rib 103 to improve the connection stability between the connector 40 and the battery box 1.

Figure 11:
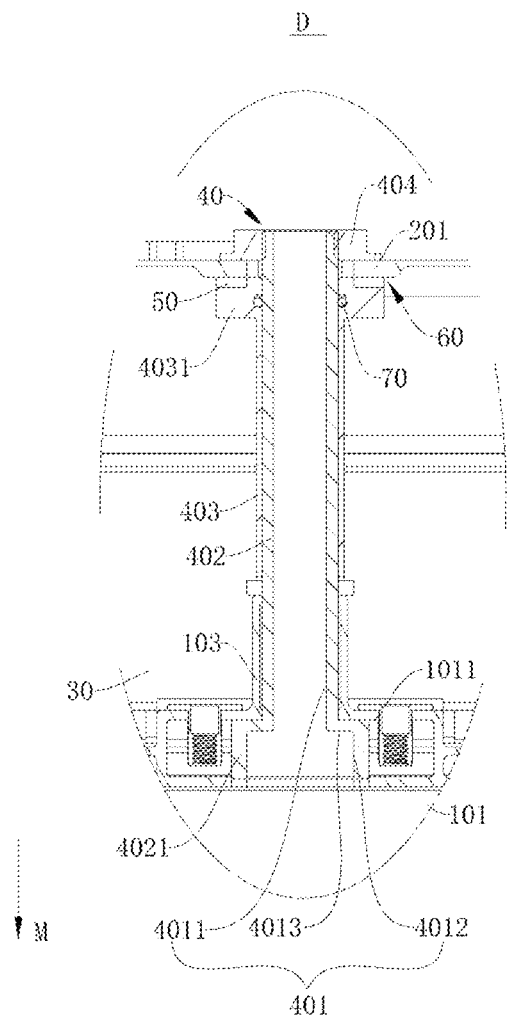
FIG. 11 is a local detailed view of a position D shown in FIG. 10.
Figure 12:
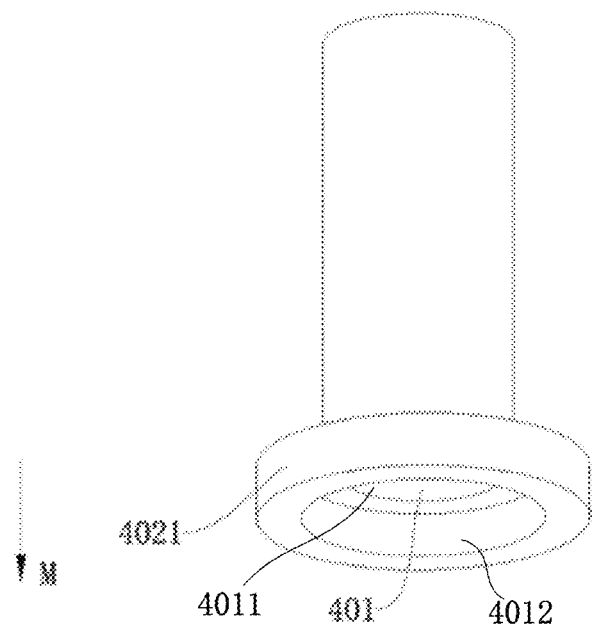
FIG. 12 is a schematic structural diagram of a connecting rod according to an embodiment of this application.
Figure 13:
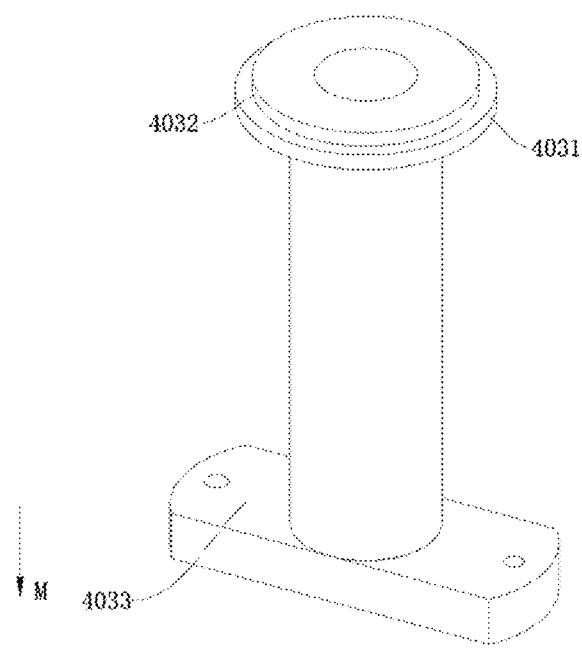
FIG. 13 is a schematic structural diagram of a reinforcing rod according to an embodiment of this application.

Further, referring to FIG. 11 to FIG. 13, FIG. 11 is a local detailed view of a position D shown in FIG. 10; FIG. 12 is a schematic structural diagram of a connecting rod according to an embodiment of this application; and FIG. 13 is a schematic structural diagram of a reinforcing rod according to an embodiment of this application. With reference to possible embodiments described above, the connector 40 in an embodiment of this application includes a guide channel 401 that runs through the cover plate 201 and the bottom plate 101 along a first direction M. Surfaces that close in to form the guide channel 401 include a first annular wall face 4011 and a second annular wall face 4012 that are successively disposed along the first direction M, and a transition surface 4013 that connects the first annular wall face 4011 and the second annular wall face 4012. In the first direction M, a projection of the second annular wall face 4012 surrounds a projection of the first annular wall face 4011.

When the battery box 1 is mounted on a vehicle, the mounting piece 3 may plug into the guide channel 401 to connect the battery pack and the vehicle. Because it is configured that the projection of the second annular wall face 4012 along the first direction M surrounds the projection of the first annular wall face 4011, the mounting piece 3 can be clamped onto the transition surface 4013 when the mounting piece 3 is inserted in the guide channel 401, so as to limit the position of the mounting piece 3 and ensure accuracy of a mounting position of the mounting piece 3.

In some optional embodiments, the projections of the first annular wall face 4011 and the second annular wall face 4012 along the first direction M are both circular, and a radial dimension of the second annular wall face 4012 is greater than that of the first annular wall face 4011. Because it is configured that the projections of the first annular wall face 4011 and the second annular wall face 4012 along the first direction M are circular, a utilization area of the guide channel 401 is increased. Under the same conditions, the first annular wall face 4011 that is circular can appropriately increase the size of the mounting piece 3 to facilitate the mounting and fixing of the mounting piece 3. The projection of the second annular wall face 4012 along the first direction M may also be rectangular or irregular, as long as the connection requirements are met.

Still referring to FIG. 10 and FIG. 11, with reference to any of the foregoing possible implementations, the connector 40 includes a connecting rod 402 extending along the first direction M and a locking piece 404. One end of the connecting rod 402 is fixedly connected to the bottom plate 101. The other end of the connecting rod 402 passes through the upper box 20 and is detachably connected to the upper box 20 through the locking piece 404. The guide channel 401 is disposed in the connecting rod 402. The connecting rod 402 is a columnar structure. The connecting rod 402 runs through the bottom plate 101 and the cover plate 201 along the first direction M to connect and support the bottom plate 101 and the cover plate 201 and improve the strength of the battery box 1.

Optionally, one end that is of the connecting rod 402 and close to the cover plate 201 at least partially protrudes out of an outer surface of the cover plate 201. The locking piece 404 sleeves on the connecting rod 402. The locking piece 404 abuts against the outer surface of the cover plate 201, and the connecting rod 402 is detachably connected to the upper box 20 through the locking piece 404. An outer peripheral surface of the connecting rod 402 that protrudes out of the outer surface of the cover plate 201 may be threaded to form a threaded structure. Correspondingly, the locking piece 404 is a threaded locking piece, and the locking piece 404 is connected to the connecting rod 402 through a self-locking effect of threads.

Still referring to FIG. 11 and FIG. 13, in some optional embodiments, to accurately mount the connecting rod 402 on the lower box 10, an outer peripheral surface of the connecting rod 402 near the bottom plate 101 contains a bulge 4021. The bottom plate 101 contains a clamping part 1011 that fits with the bulge 4021. The clamping part 1011 is at least partially held down onto an end face of the bulge 4021 oriented toward the upper box 20, so that the bottom plate 101 limits the position of the connecting rod 402.

Optionally, the bulge 4021 may surround an outer peripheral surface of the connecting rod 402. The bulge 4021 may also be a partially convex structure disposed on the outer peripheral surface of the connecting rod 402. This is not limited in this application, as long as the clamping part 1011 is at least partially held down onto the end face of the bulge 4021 oriented toward the upper box 20.

In a specific embodiment, when the reinforcing rib 103 is fixedly disposed on the bottom plate 101, the connecting rod 402 is disposed by running through the reinforcing rib 103 along the first direction M. A cavity structure exists inside the reinforcing rib 103. A cross section of the cavity structure is an inverted hollow T-shape. In this case, the clamping part 1011 is a surface disposed in opposition to the bottom plate 101 in the cavity structure of the reinforcing rib 103. With the clamping part 1011 disposed on the reinforcing rib 103, the utilization rate of the reinforcing rib 103 is improved. The clamping part 1011 limits positions of the bottom plate 101 and the connecting rod 402, and makes it convenient to assemble and mount the connector 40 quickly and accurately. When the connectors 40 are two or more in number, the connectors 40 can be assembled quickly through coordination between the clamping part 1011 and the bulge 4021, thereby effectively improving uniformity of the installation of the plurality of connectors 40 and improving the quality pass rate of the battery box 1.

To increase the stability of the connection between the connecting rod 402 and the bottom plate 101, one end of the connecting rod 402 may be welded to the bottom plate 101 to effectively ensure airtightness of the battery box 1. In addition, the welding is performed at the position where the connecting rod 402 runs through the reinforcing rib 103, the connecting rod 402 is prevented from swaying as a result of a gap between the connecting rod 402 and the reinforcing rib 103. The fixed welding of the connecting rod 402 to the bottom plate 101 and the reinforcing rib 103 ensures stability of connection between the connector 40 and the lower box 10, and ensures reliability and airtightness of the battery box 1.

In some optional embodiments, one end of the connector 40 is fixedly connected to the bottom plate 101 or the reinforcing rib 103 through an interference fit or a structural adhesive or by cold shrinkage. The cold shrinkage method is: assembling the bottom plate 101, the reinforcing rib 103, and the connecting rod 402 in a high temperature state, and then cooling them to deform the bottom plate 101 or the reinforcing rib 103 and reduce a distance between the bottom plate 101 or the reinforcing rib 103 and the connecting rod 402, so that the connecting rod 402 is fixedly connected onto the bottom plate 101.

In an optional embodiment, the connector 40 further includes a reinforcing rod 403 extending along the first direction M and sleeving on the connecting rod 402. The reinforcing rod 403 is clamped between the bottom plate 101 and the upper box 20. The reinforcing rod 403 that sleeves on the connecting rod 402 can reinforce the connecting rod 402, and the reinforcing rod 403 clamped between the bottom plate 101 and the upper box 20 further improves the strength of the battery box 1. Especially, vehicles are increasingly requiring higher electrical power, so that the battery box 1 needs to accommodate a larger number of battery modules 2 to meet the high-power requirements. Therefore, the battery box 1 needs to be enlarged to provide more space for accommodating more battery modules 2. When the battery box 1 is enlarged in size, the bottom plate 101 and the upper box 20 can be supported by the connecting rod 402 and the reinforcing rod 403 clamped between the bottom plate 101 and the upper box 20, so as to further improve the strength of the battery pack.

In an optional implementation, the battery box 1 according to each of the foregoing embodiments of this application may further include a first seal 50 that sleeves on the reinforcing rod 403. A flange 4031 is disposed on an outer peripheral surface of the reinforcing rod 403. In the first direction M, a position limiting part 4032 that protrudes out of the flange 4031 is disposed at one end of the reinforcing rod 403 near the upper box 20. The flange 4031, the position limiting part 4032, and the upper box 20 close in to form an annular mounting cavity 60, and the first seal 50 is disposed in the annular mounting cavity 60.

The first seal 50 according to this embodiment of this application is primarily configured to ensure the sealing performance of the battery box 1. Through adjustment of the position of the locking piece 404 and the connecting rod 402, the locking piece 404 moves closer to the bottom plate 101. Because the locking piece 404 abuts against the outer surface of the cover plate 201, the locking piece 404 drives the cover plate 201 to move closer to the bottom plate 101 to reduce a volume of the annular mounting cavity 60. Because the first seal 50 is disposed in the annular mounting cavity 60 and the first seal 50 is preconfigured for being capable of cushioning and deformation, the first seal 50 can be compressed when the volume of the annular mounting cavity 60 is reduced. In this way, the first seal 50 tightly abuts against the cover plate 201 and the flange 4031 under the effect of the flange 4031 and the cover plate 201, to implement airtight connection of the battery box 1. In addition, this ensures consistent distances between the cover plate 201 and the bottom plate 101, and achieves a relatively uniform contour of the battery box 1. When the battery box 1 receives an external force, the first seal 50 can absorb part of stress and reduce damage to the battery box 1 caused by the external force. In some optional embodiments, a sealant may also be applied in the annular mounting cavity 60 to meet sealing requirements of the battery box 1.

In an optional embodiment, the battery box 1 further includes a second seal 70 that sleeves on the connecting rod 402, and the second seal 70 is clamped between the connecting rod 402 and the reinforcing rod 403. The structure of the second seal 70 is similar to that of the first seal 50, and can be used to implement sealing between the connecting rod 402 and the reinforcing rod 403. In a specific implementation, the sealing between the connecting rod 402 and the reinforcing rod 403 may be implemented by a close fit between the second seal 70 and the reinforcing rod 403.

Specifically, the reinforcing rod 403 includes an annular groove. The annular groove extends from an inner surface of the reinforcing rod 403 toward an outer surface thereof. The second seal 70 sleeves on the reinforcing rod 403 and disposed in the annular groove to implement sealing between the connecting rod 402 and the reinforcing rod 403. A diameter of an inner surface of the second seal 70 is less than or equal to a diameter of an outer surface at a junction between the reinforcing rod 403 and the second seal 70. Optionally, a thickness of the second seal 70 is greater than or equal to an extension distance of the annular groove extending along an axial direction of the reinforcing rod 403. The fit between the second seal 70 and a fitting surface of the reinforcing rod 403 in size improves the airtightness between the connecting rod 402 and the reinforcing rod 403, and further improves the airtightness of the battery box 1.

A mounting part 4033 that protrudes out of the outer peripheral surface is disposed at one end of the reinforcing rod 403 near the bottom plate 101. The mounting part 4033 contains a mounting hole. A width of the mounting part 4033 matches a width of the reinforcing rib 103. A connecting hole corresponding to the mounting hole is disposed on the bottom plate 101 or the reinforcing rib 103. The reinforcing rod 403 is connected to the bottom plate 101 by fasteners disposed on the mounting hole and the connecting hole, or connected to the bottom plate 101 through the reinforcing rib 103.

When the foregoing battery box 1 is applied to a battery pack in a specific implementation, the battery module 2 may be fixedly disposed on the lower box 10. The second seal 70 is disposed in the annular groove of the reinforcing rod 403. Then the reinforcing rod 403 and the second seal 70 sleeve on the connecting rod 402 as a whole, and are fixedly connected to the lower box 10 through the mounting part 4033. Then the first seal 50 is mounted on the position limiting part 4032 of the reinforcing rod 403. Subsequently, the upper box 20 and the lower box 10 are disposed oppositely so that the upper box 20 is connected to the lower box 10. The end that is of the connecting rod 402 and close to the cover plate 201 at least partially protrudes out of the upper surface of the cover plate 201. Therefore, finally, a locking piece 404 sleeves on one end that is of the connecting rod 402 and that protrudes out of the cover plate 201. The locking piece 404 is controlled to fasten and hermetically connect the upper box 20 to the lower box 10.

In conclusion, with the battery box 1 according to this embodiment of this application, the connector 40 is disposed in the accommodation chamber 30, and the connector 40 contains the guide channel 401. The guide channel 401 runs through the bottom plate 101 and the cover plate 201 along the first direction M. In this way, the connector 40 connects the bottom plate 101 on the lower box 10 and the cover plate 201 on the upper box 20. Therefore, the connector 40 can form an effective support between the lower box 10 and the upper box 20 to enhance the strength of the battery box 1. When the battery box 1 can withstand a relatively large external force, the connector 40 can support the battery box 1 to prevent deformation.

The battery pack and the vehicle according to the embodiments of this application include the battery box 1 provided in the foregoing embodiments, and the connector 40 forms an effective support between the lower box 10 and the upper box 20 to enhance the strength of the battery pack. In this way, when the battery pack can withstand a relatively large external force, the connector 40 can support the battery box 1 to prevent deformation, and can effectively prevent damage to the battery module 2 caused by deformation of the battery box 1, thereby improving reliability and safety performance of the battery pack. In addition, the structure of the connector 40 is so simple that it will not affect the overall weight of the battery pack, thereby further optimizing the performance of the battery pack. The guide channel 401 is disposed on the connector 40. Therefore, when the battery pack is mounted onto the vehicle body 4, the mounting piece 3 can plug into the guide channel 401 to get connected to the vehicle body 4 and the battery pack. In this way, the connector 40 can provide an assembly point for the connection between the battery pack and the vehicle while enhancing the strength of the battery pack, thereby effectively improving stability and reliability of the mounting connection between the battery box 1 and the vehicle and being easy to promote and use.

It needs to be understood that the relational terms such as "first", "second" are merely used to differentiate one entity or operation from another, but do not require or imply any actual relationship or sequence between the entities or operations. It needs to be understood that the terms so used are interchangeable under appropriate circumstances, so that the embodiments in the application described herein can, for example, work or be arranged in a sequence other than those described herein or those otherwise described.

Although this application has been described with reference to exemplary embodiments, various improvements may be made to the embodiments without departing from the scope of this application, and the parts herein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A battery box, comprising:
   a lower box, comprising a bottom plate and a side plate connected to and disposed around the bottom plate;
   an upper box, connected to the side plate, wherein the upper box contains a cover plate disposed in opposition to the bottom plate, and the upper box and the lower box jointly close in to form an accommodation chamber; and
   a connector, disposed in the accommodation chamber and connected to the upper box and the lower box, wherein the connector contains a guide channel, and the guide channel runs through the bottom plate and the cover plate along a first direction;
   wherein the connector comprises a connecting rod extending along the first direction and a locking piece, the connecting rod is an integral structure, one end of the connecting rod is fixedly connected to the bottom plate, another end of the connecting rod passes through the upper box and is detachably connected to the upper box through the locking piece, the locking piece is connected to a portion of the connecting rod protruding out of an outer surface of the cover plate, the locking piece sleeves on the connecting rod, and the guide channel is disposed in the connecting rod;
   the connector further comprises a reinforcing rod extending along the first direction and sleeving out of the connecting rod, and the reinforcing rod is clamped between the bottom plate and the upper box.

2. The battery box according to claim 1, wherein surfaces that close in to form the guide channel comprise a first annular wall face and a second annular wall face that are successively disposed along the first direction, and a transition surface that connects the first annular wall face and the second annular wall face; and
   in the first direction, a projection of the second annular wall face surrounds a projection of the first annular wall face.

3. The battery box according to claim 2, wherein the connectors are two or more in number, and the two or more connectors are spaced apart from each other.

4. The battery box according to claim 1, wherein the connectors are two or more in number, and the two or more connectors are spaced apart from each other.

5. The battery box according to claim 1, wherein the connecting rod contains a bulge on an outer peripheral surface near the bottom plate, the bottom plate contains a clamping part that fits with the bulge, and the clamping part is at least partially held down onto an end face of the bulge oriented toward the upper box.

6. The battery box according to claim 1, wherein the battery box further comprises a first seal that sleeves on the reinforcing rod, and a flange is disposed on an outer peripheral surface of the reinforcing rod; and
   in the first direction, a position limiting part that protrudes out of the flange is disposed at one end of the reinforcing rod near the upper box; the flange, the position limiting part, and the upper box close in to form an annular mounting cavity, and the first seal is disposed in the annular mounting cavity.

7. The battery box according to claim 6, wherein the battery box further comprises a second seal that sleeves on the connecting rod, and the second seal is clamped between the connecting rod and the reinforcing rod.

8. The battery box according to claim 1, wherein the battery box further comprises a second seal that sleeves on the connecting rod, and the second seal is clamped between the connecting rod and the reinforcing rod.

9. A battery pack, comprising:
   the battery box according to claim 1; and
   a battery module, disposed in an accommodation chamber and connected to a lower box.

10. A vehicle, comprising:
    a vehicle body;
    the battery pack according to claim 9;
    a mounting piece, inserted in the guide channel and connected to the vehicle body and the battery pack.

* * * * *